(12) United States Patent
Lee et al.

(10) Patent No.: US 7,653,501 B2
(45) Date of Patent: Jan. 26, 2010

(54) APPARATUS FOR DETERMINING DIAMETER OF PARABOLIC ANTENNA AND METHOD THEREFOR

(75) Inventors: Jeom-hun Lee, Daejeon (KR); Jae-Hoon Kim, Daejeon (KR); Ho-Jin Lee, Daejeon (KR)

(73) Assignee: Electronics ADN Telecommunications Research Institute, Daejon (KR)

(*) Notice: Subject to any disclaimer, the term of this patent is extended or adjusted under 35 U.S.C. 154(b) by 108 days.

(21) Appl. No.: 12/088,461

(22) PCT Filed: Dec. 26, 2005

(86) PCT No.: PCT/KR2005/004550

§ 371 (c)(1),
(2), (4) Date: Mar. 28, 2008

(87) PCT Pub. No.: WO2007/037577

PCT Pub. Date: Apr. 5, 2007

(65) Prior Publication Data

US 2008/0249739 A1  Oct. 9, 2008

(30) Foreign Application Priority Data

Sep. 29, 2005 (KR) .................. 10-2005-0091561
Nov. 15, 2005 (KR) .................. 10-2005-0109244

(51) Int. Cl.
*G01R 23/00* (2006.01)
(52) U.S. Cl. ........................................... 702/75
(58) Field of Classification Search .............. 702/75; 343/781 P, 781 R, 840
See application file for complete search history.

(56) References Cited

U.S. PATENT DOCUMENTS

| | | | |
|---|---|---|---|
| 4,263,599 A | | 4/1981 | Bielli et al. |
| 5,160,937 A | * | 11/1992 | Fairlie et al. ............. 343/781 P |
| 5,790,077 A | * | 8/1998 | Luh et al. ................ 343/781 P |
| 6,633,264 B2 | * | 10/2003 | Kent et al. ............... 343/781 R |

FOREIGN PATENT DOCUMENTS

EP  0 005 487  11/1979

OTHER PUBLICATIONS

Hal Schrank et al., "Design of Offset-Parabolic-Reflector Antennas for Low Cross-Pol and Low Sidelobes" IEEE Antennas and Propagation Magazine, vol. 35, No. 6, pp. 46-49, Dec. 1993.
International Search Report for PCT/KR2005/004550 dated Jun. 27, 2006.

* cited by examiner

*Primary Examiner*—Tung S Lau
*Assistant Examiner*—Xiuquin Sun
(74) *Attorney, Agent, or Firm*—Kile Goekjian Reed & McManus PLLC; Jae Y. Park

(57) ABSTRACT

Provided are an apparatus and method for determining a diameter of a reflector antenna. The apparatus includes a setting unit for setting up electrical characteristic values of the reflector antenna upon receipt thereof from outside, a parameter input unit for receiving a frequency, an antenna diameter variable value, antenna efficiency, Edge Taper (ET), and an Edge Of Coverage (EOC) angle as parameters for each of multiple frequencies to be accommodated in the reflector antenna, a graph generator for generating, on one rectangular coordinate, a graph representing the relationship between an antenna diameter and EOC directivity with respect to the EOC angle based on the parameters for each frequency received through the parameter input unit, an antenna diameter determination unit for determining an antenna diameter that simultaneously meets the preset EOC directivities for the frequencies to be accommodated in the reflector antenna by using the graph generated by the graph generation unit, and a graph output unit for mapping and outputting the graph generated by the graph generation unit on one rectangular coordinate with an antenna diameter axis and an EOC directivity axis to thereby represent the antenna diameter determined by the antenna diameter determination unit on the graph.

12 Claims, 5 Drawing Sheets

APPARATUS FOR DETERMINING DIAMETER OF PARABOLIC ANTENNA AND METHOD THEREFOR

TECHNICAL FIELD

The present invention relates to an apparatus for determining a diameter of a reflector antenna and a method therefor; and, more particularly, to an apparatus and method which are capable of easily and rapidly determining an optimal antenna diameter by expressing Edge Of Coverage (EOC) directivity required for multiple frequencies on one rectangular coordinate in designing the reflector antenna.

BACKGROUND ART

Generally, in reflector antenna mounted on communication satellite, a diameter thereof is determined so that it has an optimal EOC gain. In particular, a parabolic antenna accommodating two or more frequencies adjusts a diameter of aperture in order to meet EOC directivity at the two frequencies.

In a conventional method for determining a diameter of such reflector antenna mounted on communication satellite, pattern results for each frequency are analyzed by calculating a frequency, a predetermined antenna diameter and antenna structure data as input values.

FIG. 1 is a flowchart for describing a conventional method for determining a diameter of a reflector antenna mounted on communication satellite, wherein a procedure for determining a diameter of a parabolic antenna accommodating two frequencies is illustrated.

First of all, electrical characteristic values such as a frequency, an EOC gain, a sidelobe level, and an X-polarization level are set up at step 101.

Thereafter, a first frequency, an antenna diameter variable value and an antenna geometry variable value are inputted as parameters for the first frequency at step 102, and pattern calculation (simulation) is performed at step 103. Next, an EOC gain acquired by the pattern calculation is analyzed at step 104. In the analysis, if the EOC gain is within the set value range at step S105, the process of the prior art goes to step 106 to carry out a procedure for a second frequency. If the EOC gain is out of the set value range at step 105, the process increases/decreases the antenna diameter variable value depending on a prescribed rule at step 106, and then returns to step 103 to repeatedly perform the processes as described above.

In the meantime, if an antenna diameter for the first frequency is determined, a second frequency, an antenna diameter variable value and an antenna geometry variable value are inputted as parameters for the second frequency at steps 107 and 108, and pattern calculation (simulation) is performed at step 103. And then, an EOC gain acquired by the pattern calculation is analyzed at step 104. In the analysis, if the EOC gain is within the set value range at step 105, the process goes to step 109 wherein an antenna diameter meeting the two frequencies is determined. However, if the EOC gain is out of the set value range at step 105, the process increases/decreases the antenna diameter variable value depending on the prescribed rule at step 106, and then returns to step 103 to repeatedly perform the processes as set forth above.

Upon completion of the processes of the steps 101 to 108, two antenna diameters are determined for the two frequencies, i.e., the first and second frequencies. Then, in order to accommodate the two frequencies in one antenna, the process further performs steps 109 and 110 to determine an optimal one of the two diameters that meets EOC directivity at the two frequencies.

That is, the antenna diameter variable values determined for the first and the second frequencies are compared with each other at step 109. If the two values are not the same, the process increases/decreases the antenna diameter variable values depending on the prescribed rule, and then returns to step 103 to repeatedly perform the above-mentioned processes. If the two values are the same, the process determines the antenna diameter variable values determined for the first and the second frequencies as the optimal antenna diameter at step 110.

In the above-mentioned conventional method for determining the antenna diameter, however, it is required to repeatedly carry out the same calculation procedure with respect to each frequency, and is also difficult to find an optimal antenna diameter if the difference between the two frequencies is large or many frequencies are used.

DISCLOSURE

Technical Problem

It is, therefore, an object of the present invention to provide an apparatus and method which are capable of easily and rapidly determining an optimal antenna diameter by expressing EOC directivity required for multiple frequencies in one rectangular coordinate in designing a reflector antenna.

Technical Solution

In accordance with one aspect of the present invention, there is provided an apparatus for determining a diameter of a reflector antenna, including: a setting unit for setting up electrical characteristic values of the reflector antenna upon receipt thereof from outside; a parameter input unit for receiving a frequency, an antenna diameter variable value, antenna efficiency, ET, and an EOC angle as parameters for each of multiple frequencies to be accommodated in the reflector antenna; a graph generator for generating, on one rectangular coordinate, a graph representing the relationship between an antenna diameter and EOC directivity with respect to the EOC angle based on the parameters for each frequency received through the parameter input unit; an antenna diameter determination unit for determining an antenna diameter that simultaneously meets the preset EOC directivities for the frequencies to be accommodated in the reflector antenna by using the graph generated by the graph generation unit; and a graph output unit for mapping and outputting the graph generated by the graph generation unit on one rectangular coordinate with an antenna diameter axis and an EOC directivity axis, to thereby represent the antenna diameter determined by the antenna diameter determination unit on the graph.

In accordance with another aspect of the present invention, there is provided a method for determining a diameter of a reflector antenna, including the steps of: setting up electrical characteristic values of the reflector antenna upon receipt thereof from outside; receiving a frequency, an antenna diameter variable value, antenna efficiency, ET, and an EOC angle as parameters for each of multiple frequencies to be accommodated in the reflector antenna; generating, on one rectangular coordinate, a graph representing the relationship between an antenna diameter and EOC directivity with respect to the EOC angle based on the parameters received for each frequency; determining an antenna diameter that simultaneously meets the preset EOC directivity for the frequencies to be accommodated in the reflector antenna by using the generated graph; and mapping and outputting the generated graph on a rectangular coordinate with an antenna diameter axis and an EOC directivity axis, to thereby represent the determined antenna diameter on the graph.

The other objectives and advantages of the invention will be understood by the following description and will also be appreciated by the embodiments of the invention more clearly. Further, the objectives and advantages of the invention will readily be seen that they can be realized by the means and its combination specified in the claims.

ADVANTAGEOUS EFFECTS

As mentioned above and will be described below, the present invention can easily and rapidly determine an optimal antenna diameter by expressing EOC directivity required for multiple frequencies in one rectangular coordinate in designing a parabolic reflector antenna used in satellite communications and so on.

DESCRIPTION OF DRAWINGS

The above and other objects and features of the present invention will become apparent from the following description of the preferred embodiments given in conjunction with the accompanying drawings, in which.

BEST MODE FOR THE INVENTION

The above-mentioned objectives, features, and advantages will be more apparent by the following detailed description in association with the accompanying drawings, and thus, the invention will be readily conceived by those skilled in the art to which the invention pertains. Further, in the following description, well-known arts will not be described in detail if it seems that they could obscure the invention in unnecessary detail. Hereinafter, preferred embodiments of the present invention will be set forth in detail with reference to the accompanying drawings.

Figure 1:
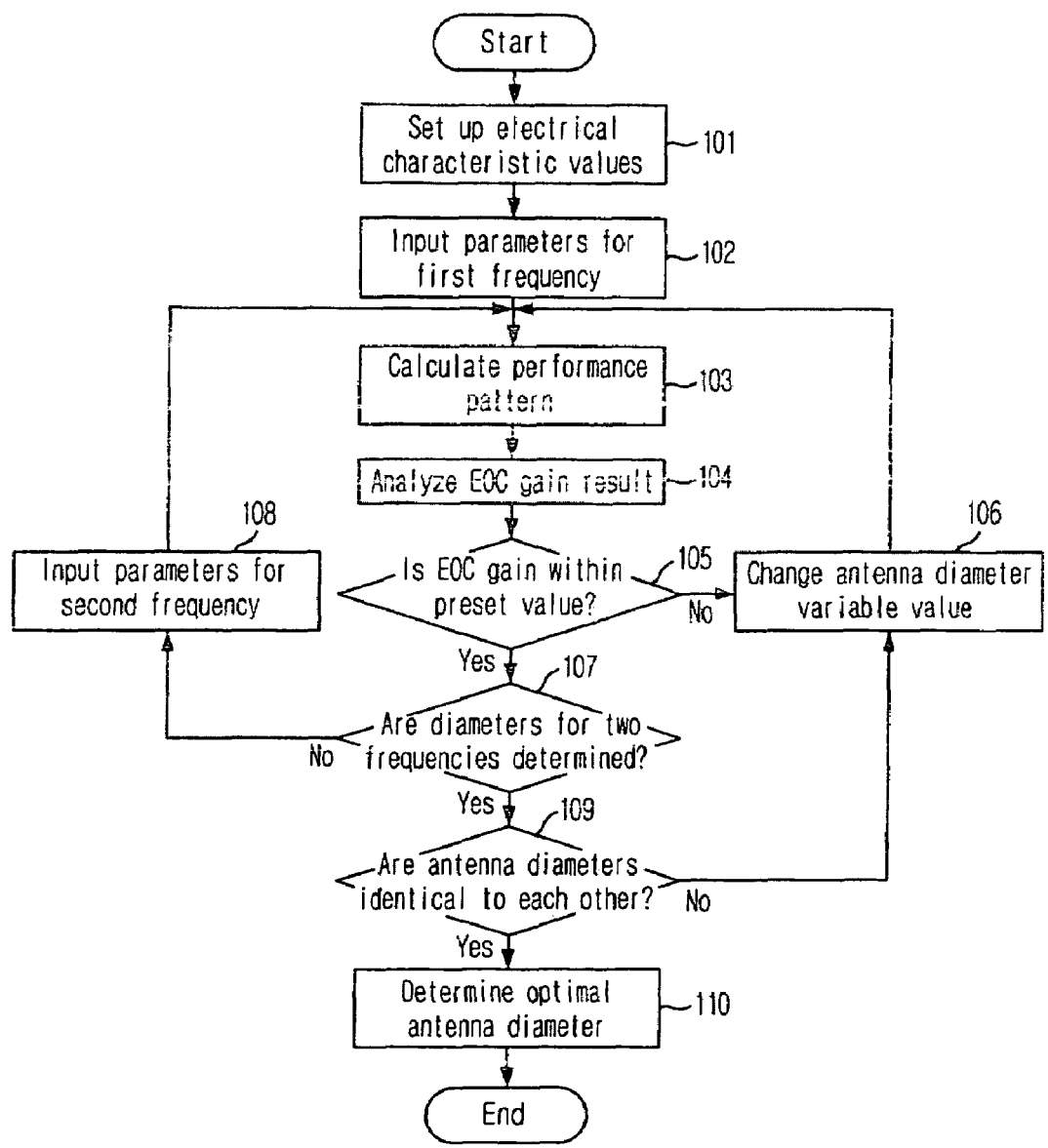
FIG. 1 is a flowchart for describing a conventional method for determining a diameter of a reflector antenna mounted on communication satellite.
Figure 2:
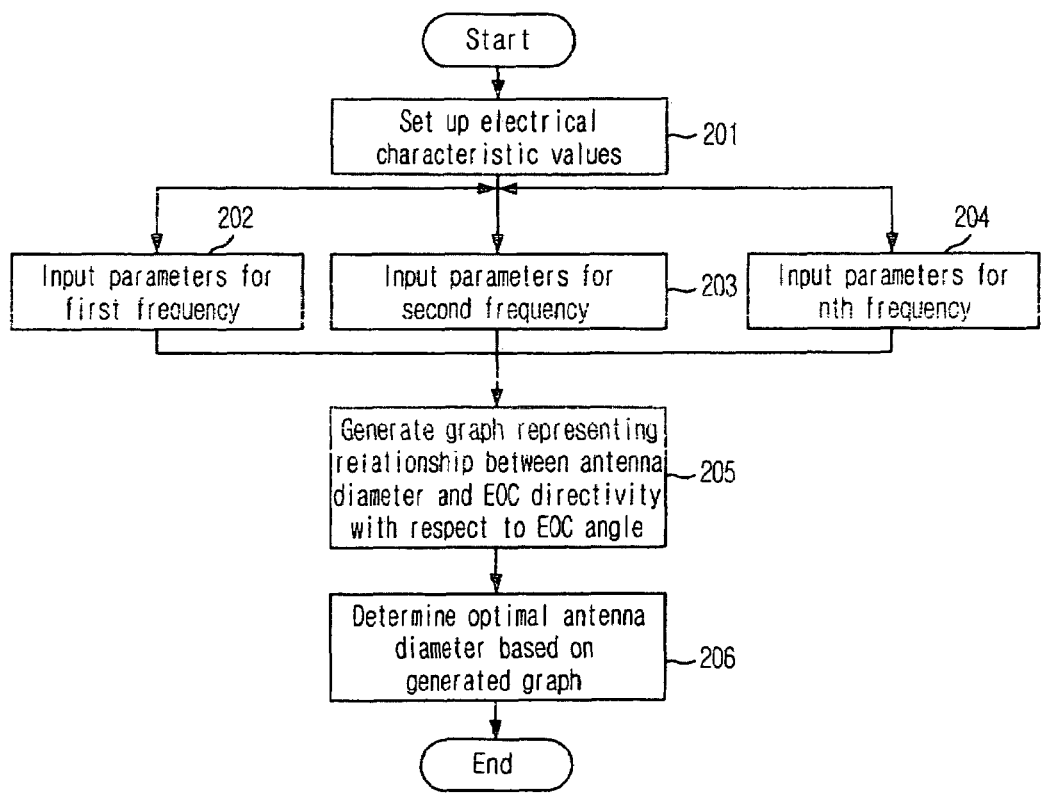
FIG. 2 illustrates a flowchart for describing a method for determining a diameter of a reflector antenna mounted on communication satellite in accordance with a preferred embodiment of the present invention.

FIG. 2 shows a flowchart for describing a method for determining a diameter of a reflector antenna mounted on communication satellite in accordance with a preferred embodiment of the present invention, wherein a procedure for determining a diameter of a parabolic antenna accommodating an n-number of frequencies is illustrated.

First of all, the process of the invention sets up electrical characteristic values such as a frequency, an EOC gain, a sidelobe level, and an X-polarization level at step 201.

Thereafter, the process inputs a frequency, an antenna diameter variable value, antenna efficiency, Edge Taper (ET), and an EOC angle as parameters in parallel for each frequency at steps 202 to 204.

Next, the process generates a graph representing the relationship between an antenna diameter and EOC directivity with respect to an EOC angle based on the inputted parameters for each frequency at step 205.

Figure 3:
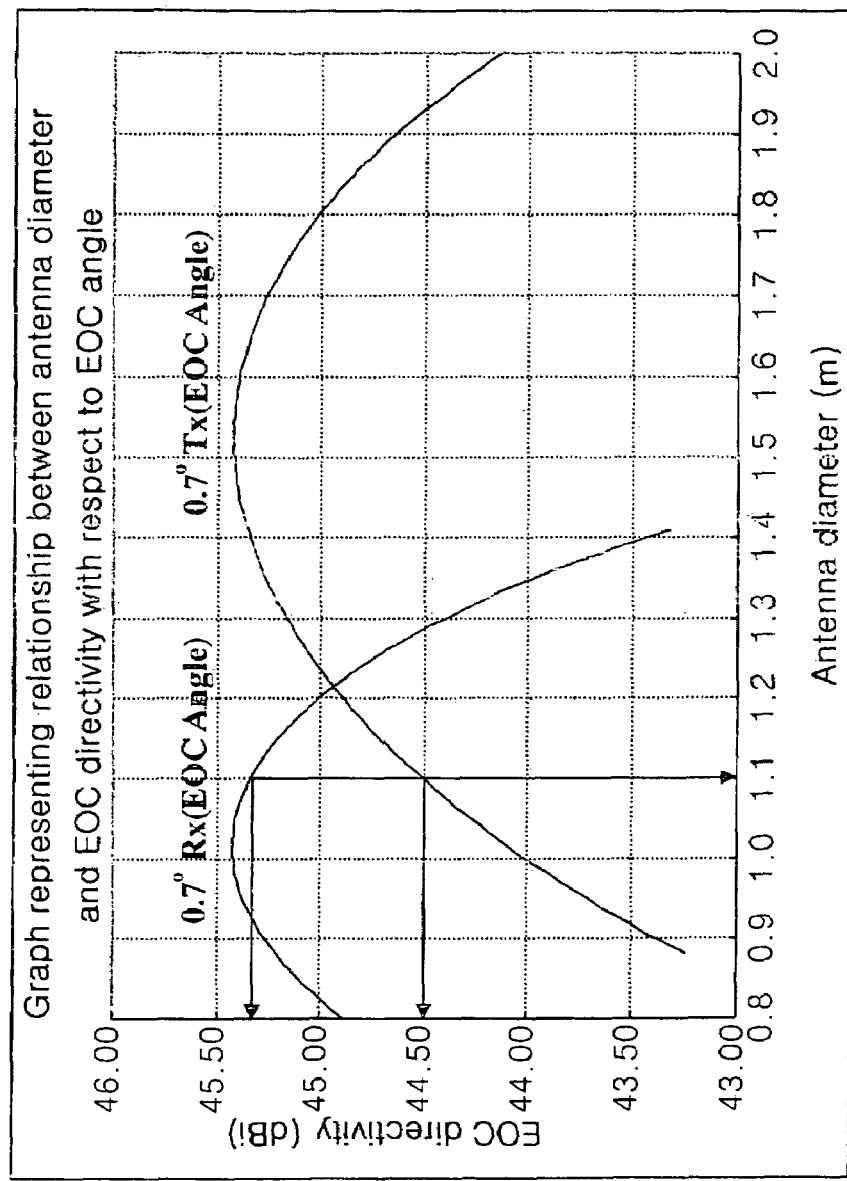
FIG. 3 offers a graph representing the relationship between an antenna diameter and EOC directivity with respect to an EOC angle.

The graph thus generated has the shape as shown in FIG. 3. In other words, FIG. 3 offers an example of applying a set of parameters of 20 GHz and 30 GHz, wherein the graph exhibits EOC directivities in terms of antenna diameters at an EOC angle 0.7°. On the graph, an optimal antenna diameter can be determined by finding an antenna diameter (X-axis value) having the required directivity (Y-axis value). The following is a detailed description of the graph showing the relationship between an antenna diameter and EOC directivity at an EOC angle with reference to FIG. 3.

When directivity and frequency in terms of a circular reflector antenna diameter D with respect to a beam axis (On-axis) are $G_o$ and $f_m$ respectively, $G_o$ is expressed as follows:

$$G_o(dB) = 10 \log(110 \eta D^2 f_{m(GHz)}^2) \qquad \text{Eq. (1)}$$

wherein an efficiency factor $\eta$ satisfies the inequality $0 \leq \eta \leq 1$.

Meanwhile, the reflector antenna 3 dB beam width is approximately represented by:

$$\theta_3 = \frac{k \cdot \lambda}{D_m} deg \qquad \text{Eq. (2)}$$

wherein k is a beam width constant and an actual ET value of antenna ranges from 5 dB to 20 dB, an average value of which is about 15 dB. Accordingly, a k value is about 70. Further, $D_m$ denotes an antenna diameter, and thus, Eq. (2) may be expressed as:

$$\theta_3 = \frac{21}{f_{GHz} D_m} deg \qquad \text{Eq. (3)}$$

Further, the shape of beam around the beam axis (on-axis) is defined by:

$$G_{off} = G_a \cos^2\left(90 \frac{\theta_{off}}{\theta_3}\right) = G_{EOC} \qquad \text{Eq. (4)}$$

wherein the directivity $G_{off}$ at an off-axis angle $\theta_{off}$ is the same as EOC directivity $EOC_{eoc}$ at an EOC angle of satellite. The result is applied in FIG. 3.

As described in the above, the X-axis on the graph indicates the antenna diameter and the Y-axis denotes the EOC directivity, and therefore, an optimal antenna diameter (X-axis value) meeting the required EOC directivity (Y-axis value) can be found.

After creating the graph that represents the relationship between the antenna diameter and the EOC directivity at the EOC angle for each frequency through the above processes on one coordinate plane, an optimal antenna diameter (X-axis value) that satisfies the required EOC directivity (Y-axis value) is determined by using the generated graph at step 206.

Figure 4:
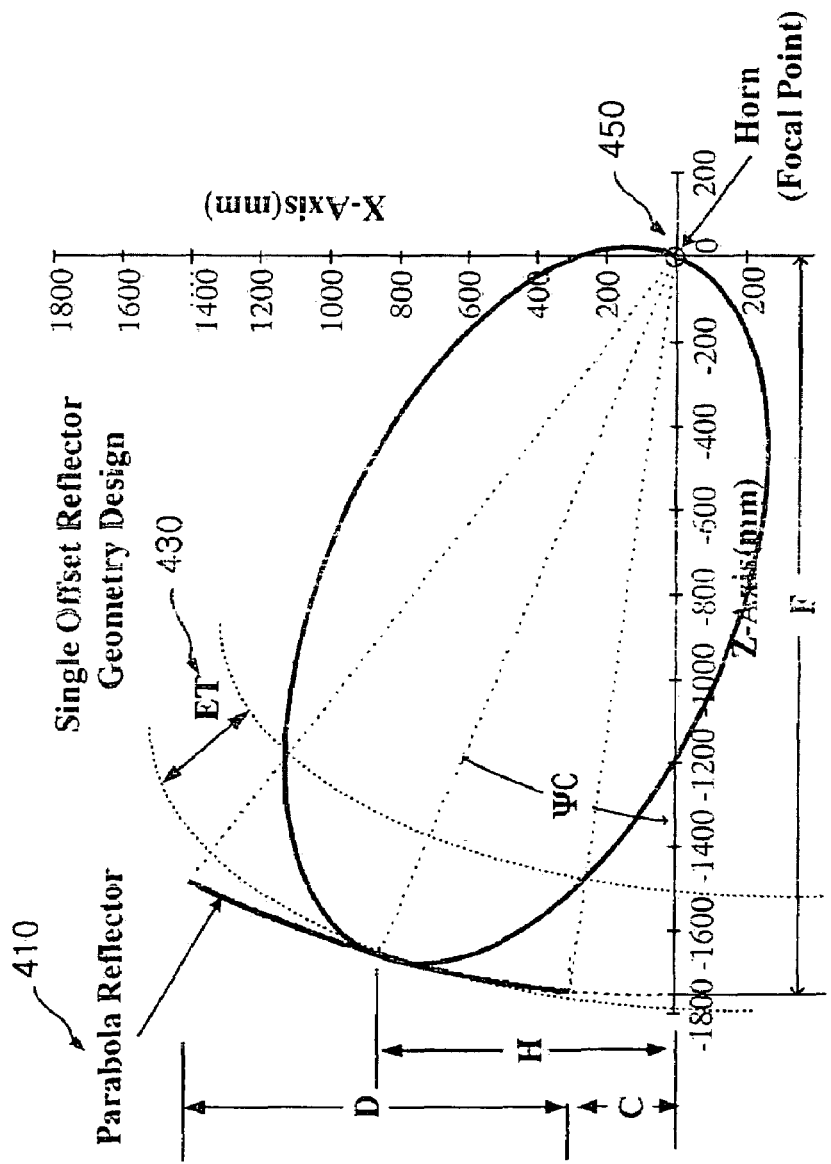
FIG. 4 describes a design structure of a reflector antenna.

For reference, FIG. 4 depicts a design structure of a parabolic antenna. Indicated by reference numeral 410 is a diameter of antenna aperture, indicated by reference numeral 430 is a feed horn pattern, and indicated by reference numeral 450 is a position of antenna focal point.

Figure 5:
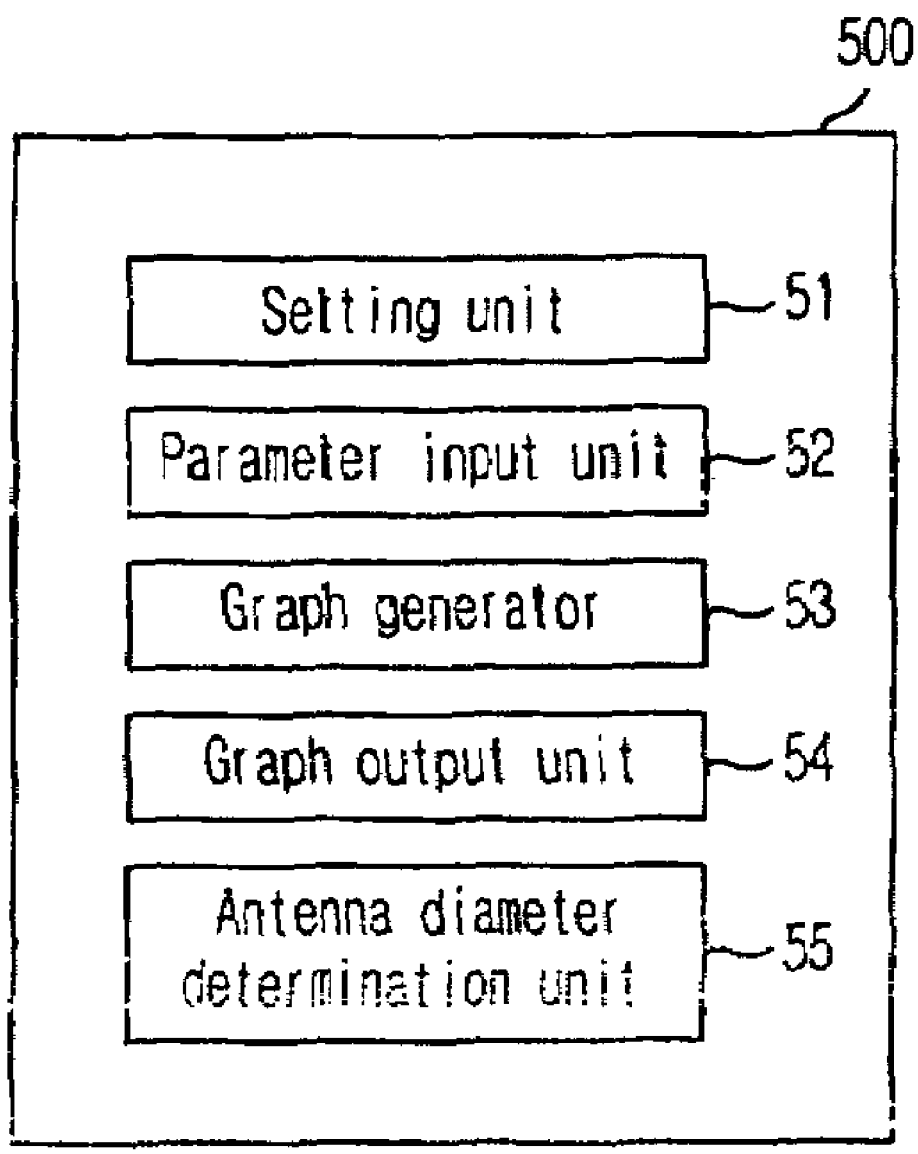
FIG. 5 illustrates a configuration of an apparatus for determining a diameter of a reflector antenna mounted on communication satellite in accordance with a preferred embodiment of the invention.

FIG. 5 illustrates a configuration of an apparatus for determining a diameter of a reflector antenna mounted on communication satellite in accordance with a preferred embodiment of the invention.

The antenna diameter determination apparatus 500 shown in FIG. 5 includes a setting unit 51, a parameter input unit 52, a graph generator 53, a graph output unit 54 and an antenna diameter determination unit 55.

The setting unit 51 sets up electrical characteristic values of the reflector antenna such as a frequency, an EOC gain, a sidelobe level, and an X-polarization level upon receipt thereof from the outside.

The parameter input unit 52 is provided with plural modules that process in parallel for respective frequencies, wherein a frequency, an antenna diameter variable value, antenna efficiency, ET, and an EOC angle are inputted as parameters for each frequency.

The graph generator 53 generates, on one rectangular coordinate, a graph representing the relationship between an antenna diameter and EOC directivity with respect to an EOC angle based on the parameters for each frequency taken by the parameter input unit 52. The generation principle of the graph is described in the above, and thus, details thereof will be omitted here for simplicity.

The antenna diameter determination unit 55 determines an antenna diameter that simultaneously satisfies the preset EOC directivity for multiple frequencies by using the graph created by the graph generator 53.

The graph output unit 54 maps and outputs the graph created by the graph generator 53 on the rectangular coordinate with an antenna diameter axis and an EOC directivity axis to thereby express the antenna diameter determined by the antenna diameter determination unit 55 on the graph.

As mentioned above, the present invention easily and rapidly determines an optimal antenna diameter by expressing EOC directivity required for multiple frequencies on one rectangular coordinate in designing a reflector antenna mounted on communication satellite. Especially, the invention can readily and rapidly determine an optimal antenna diameter, without any repetitive calculation procedure, even when the difference of multiple frequencies to be accommodated in one reflector antenna is large.

The method of the present invention as mentioned above may be implemented by a software program that is stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application No. 10-2005-0091561 and 10-2005-0109244, filed in the Korean Intellectual Property Office on Sep. 29, 2005 and Nov. 15, 2005, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for determining a diameter of a reflector antenna, comprising:

a setting means for setting up electrical characteristic values of the reflector antenna upon receipt of the characteristic values from outside;

a parameter input means for receiving a frequency, an antenna diameter variable value, antenna efficiency, Edge Taper (ET), and an Edge Of Coverage (EOC) angle as parameters for each of multiple frequencies to be accommodated in the reflector antenna;

a graph generation means for generating, on one rectangular coordinate, a graph representing the relationship between an antenna diameter and EOC directivity with respect to the EOC angle based on the parameters for each frequency received through the parameter input means;

an antenna diameter determination means for determining an antenna diameter that simultaneously meets the preset EOC directivities for the frequencies to be accommodated in the reflector antenna by using the graph generated by the graph generation means; and a graph output means for mapping and outputting the graph generated by the graph generation means on one rectangular coordinate with an antenna diameter axis and an EOC directivity axis to thereby represent the antenna diameter determined by the antenna diameter determination means on the graph.

2. The apparatus as recited in claim 1, wherein the electrical characteristic values set up by the setting means include a frequency, an EOC gain, a sidelobe level, and an X-polarization level.

3. The apparatus as recited in claim 1, wherein the parameter input means receives the parameters for the respective frequencies to be accommodated in the reflector antenna in parallel.

4. The apparatus as recited in claim 1, wherein the graph generated by the graph generation means is provided on a rectangular plane where the antenna diameter with respect to the EOC angle is X-axis and EOC directivity is Y-axis, and a directivity $G_o$ in terms of a circular reflector antenna diameter D with respect to a beam axis (on-axis) meets the following equation for a frequency $f_m$: $G_o(dB) = 10 \log(110\eta D^2 f^2_{fm(GHz)})$ where an efficiency factor $\eta$ satisfies the inequality $0 \leq \eta \leq 1$.

5. The apparatus as recited in claim 4, wherein the antenna is designed in a manner that a beam width is defined by the following equation:

$$\theta_3 = \frac{k \cdot \lambda}{D_m} deg,$$

and the shape of beam around the beam axis (on-axis) is as follows:

$$\theta_3 = \frac{21}{f_{GHz} D_m} deg,$$

k being a beam width constant and $D_m$ denoting an antenna diameter.

6. The apparatus as recited in claim 5, wherein the antenna is designed in a manner that directivity $G_{off}$ at an off-axis angle $\theta_{off}$ is represented by the following equation:

$$G_{off} = G_a \cos^2\left(90\frac{\theta_{off}}{\theta_3}\right) = G_{EOC}.$$

7. A method for determining a diameter of a reflector antenna, comprising the steps of:
   setting up electrical characteristic values of the reflector antenna upon receipt of the characteristic values from outside;
   receiving a frequency, an antenna diameter variable value, antenna efficiency, ET, and an EOC angle as parameters for each of multiple frequencies to be accommodated in the reflector antenna;
   generating, on one rectangular coordinate, a graph representing the relationship between an antenna diameter and EOC directivity with respect to the EOC angle based on the parameters received for each frequency;
   determining an antenna diameter that simultaneously meets the preset EOC directivities for the frequencies to be accommodated in the reflector antenna by using the generated graph; and
   mapping and outputting the generated graph on a rectangular coordinate with an antenna diameter axis and an EOC directivity axis, to thereby represent the determined antenna diameter on the graph.

8. The method as recited in claim 7, wherein the electrical characteristic values set up by the setting step include a frequency, an EOC gain, a sidelobe level, and an X-polarization level.

9. The method as recited in claim 7, wherein the parameter receiving step receives the parameters for the respective frequencies to be accommodated in the reflector antenna in parallel.

10. The method as recited in claim 7, wherein the graph generated by the graph generating step is provided on a rectangular plane where the antenna diameter with respect to the EOC angle is X-axis and EOC directivity is Y-axis, and a directivity $G_o$ in terms of a circular reflector antenna diameter D with respect to a beam axis (on-axis) meets the following equation for a frequency $f_m$: $G_o(dB) = 10 \log(110 \eta D^2 f^2_{fm(GHz)})$ where an efficiency factor $\eta$ satisfies the inequality $0 \leq \eta \leq 1$.

11. The apparatus as recited in claim 10, wherein the antenna is designed in a manner that a beam width is defined by the following equation:

$$\theta_3 = \frac{k \cdot \lambda}{D_m} deg,$$

and the shape of beam around the beam axis (on-axis) is as follows:

$$\theta_3 = \frac{21}{f_{GHz} D_m} deg,$$

k being a beam width constant and $D_m$ denoting an antenna diameter.

12. The method as recited in claim 11, wherein the antenna is designed in a manner that directivity $G_{off}$ at an off-axis angle $\theta_{off}$ is represented by the following equation:

$$G_{off} = G_a \cos^2\left(90\frac{\theta_{off}}{\theta_3}\right) = G_{EOC}.$$

* * * * *